United States Patent [19]

Karppo

[11] Patent Number: 5,449,488
[45] Date of Patent: Sep. 12, 1995

[54] METHOD FOR THE HEAT TREATMENT OF A CABLE

[75] Inventor: Jukka Karppo, Helsinki, Finland

[73] Assignee: Nokia- Maillefer Oy, Finland

[21] Appl. No.: 232,068

[22] PCT Filed: Oct. 29, 1992

[86] PCT No.: PCT/FI92/00291

§ 371 Date: Apr. 28, 1994

§ 102(e) Date: Apr. 28, 1994

[87] PCT Pub. No.: WO93/09548

PCT Pub. Date: May 13, 1993

[30] Foreign Application Priority Data

Oct. 30, 1991 [FI] Finland ................... 915124

[51] Int. Cl.$^6$ ............................. B29C 47/88
[52] U.S. Cl. ..................... 264/555; 264/85; 264/557; 264/235; 264/236; 264/237; 425/113; 425/445
[58] Field of Search ............... 264/174, 237, 348, 235, 264/236, 347, 555, 557, 85; 425/113, 114, 445

[56] References Cited

U.S. PATENT DOCUMENTS

| | | |
|---|---|---|
| 3,553,042 | 1/1971 | Cocco . |
| 3,635,621 | 1/1972 | Miyauchi et al. ............ 425/445 |
| 3,849,192 | 11/1974 | Schmidt ...................... 264/174 |
| 3,997,288 | 12/1976 | Takaoka et al. . |
| 4,035,129 | 7/1977 | Karppo et al. ............... 425/445 |
| 4,078,111 | 3/1978 | Yamaguchi et al. .......... 264/174 |
| 4,110,062 | 8/1978 | Summers . |
| 4,150,082 | 4/1979 | Brick et al. ................. 264/174 |
| 4,259,281 | 3/1981 | Lanfranconi ................. 425/445 |
| 4,457,975 | 7/1984 | Bahder ......................... 425/445 |
| 4,980,001 | 12/1990 | Cornibert et al. . |

FOREIGN PATENT DOCUMENTS

| | | |
|---|---|---|
| 0132147 | 1/1985 | European Pat. Off. . |
| 0435154A1 | 7/1991 | European Pat. Off. . |
| 2357984 | 5/1975 | Germany . |
| 2444952 | 4/1976 | Germany . |
| 2542532 | 4/1977 | Germany . |
| 2620898 | 12/1977 | Germany . |
| 2732629 | 1/1978 | Germany ..................... 264/174 |
| 2754586 | 7/1978 | Germany . |
| 3022445 | 12/1981 | Germany ..................... 425/113 |
| 3428946 | 5/1986 | Germany ..................... 264/174 |
| 2028713 | 3/1980 | United Kingdom . |

*Primary Examiner*—Jeffery R. Thurlow
*Attorney, Agent, or Firm*—Nixon & Vanderhye

[57] ABSTRACT

The invention relates to a method in connection with a process for insulating or sheathing conductors or the like, wherein plastic material is extruded into at least one layer on the surface of the conductor (1), and the conductor coated with the plastic material (2, 3, 4) is cooled in a predetermined manner. To avoid problems caused by the shrinking of the plastic material, after the cooling of the conductor (1) and the plastic material in vicinity to it to a predetermined level in the insulating or sheathing process, the surface layer of the plastic material and the plastic material portions in vicinity to it are reheated to a predetermined temperature in a pressurized space filled with a medium.

1 Claim, 2 Drawing Sheets

METHOD FOR THE HEAT TREATMENT OF A CABLE

The invention relates to a method in which plastic material is extruded into at least one layer on the surface of a conductor or the like, and the conductor or the like coated with the plastic material is cooled in a predetermined manner in connection with an insulating or sheathing process.

In the production of cables, there occurs problems due to the large change of the specific volume of plastic materials, such as polyethylene, on transition from the melting point to the room temperature. This is because the large change of the specific volume causes a disadvantageous shrinking phenomenon to occur in the cable, which tends to shorten the plastic layer around the conductors, thus causing problems in cable extensions and terminals. The shrinking effect has previously been reduced by applying a heat treatment to the finished cable or conductor wound on a reel. A problem therewith is, however, that as the stresses are released, when the cable is bent around the reel, further stress states are created in the plastic material when the cable is straightened. The heat treatment of the cable wound on a reel also requires plenty of time, at least 2 to 3 days, as well as plenty of energy.

The object of the invention is to provide a method by means of which the disadvantages of the prior art can be eliminated. This is achieved by means of a method according to the invention, which is characterized in that after the cooling of the conductor and the plastic material in vicinity to it to a predetermined level in the insulating or sheathing process, the surface layer of the plastic material and the plastic material portions in vicinity to it are reheated to a predetermined temperature in a pressurized space filled with a medium.

An advantage of the invention is mainly that the above-mentioned shrinking problems can be eliminated in a very short time and by a considerably lower consumption of energy as compared with the previously used technique. An example of the savings obtained in terms of energy consumption is that the heat treatment of a specific cable required an amount of energy of about 32 kWh/km when applying the method according to the invention. When using the prior art heat treatment with a corresponding cable wound on a reel, the energy consumption is about 46 kWh/km if the temperature of the cable is raised from 20° C. to 100° C. In addition, a considerable amount of energy is consumed in heating the reel and in the losses of the heat treatment space. A further advantage of the invention is that, contrary to the prior art technique, no new stress states are created in the cable as the heat treatment according to the invention is performed on straight cable in place of cable wound on a reel.

BRIEF DESCRIPTION OF THE DRAWINGS

In the following the invention will be described more closely by means of an example shown in the attached drawings, wherein

FIG. 1 shows a typical cross-section of an insulated conductor of a high-voltage cable. A thin semi-conductive plastic layer, a conductor shielding 2, is provided around the conductor 1. The conductor shielding 2 is covered by an insulation 3, and the outermost layer also consists of a rather thin, semi-conductive corona shielding 4. The finished cable further comprises a varying number of different layers, which, however, are well-known to one skilled in the art, and are not as such directly related to the invention. These layers will not be described in greater detail herein. The thickness of the plastic layer on the conductor in medium- and high-voltage cables varies e.g. in the range from 5 to 35 mm. A widely used insulation material is cross-linking or thermoplastic polyethylene.

The layers 2 to 4 on the conductor 1 are extruded on the conductor simultaneously in a so-called triple extrusion head, into which plastic materials for the different layers are usually supplied from three separate plastic extruders. When using cross-linking insulation plastic, the maximum extrusion temperature of the plastic should be about 140° C. in order to avoid an untimely cross-linking reaction within the plastic extruder. To reduce the reaction time, the insulation material is heated after the plastic extruder typically to a temperature ranging from about 190° to 210° C. Heating is usually carried out by means of steam or heat radiation in a pressurized tube. Pressure is required to prevent the formation of bubbles due to the gases formed in the cross-linking reaction. An excessively rapid surface cooling may also contribute to the formation of bubbles within the insulation layer as it prevents the shrinking of the diameter.

If thermoplastic polyethylene is used as insulation material, the extrusion temperature of the plastic is between 170° and 230° C. As no reactions occur in the plastic material, pressure as such is not needed in this case, whereas the cooling effected by air or warm water must take place very slowly in order to avoid the formation of bubbles due to the shrinking of the plastic material. For this reason, a cable insulated by a thermoplastic material is also cooled under pressure, i.e. at a pressure above the atmospheric pressure.

Today it is customary to use a low-density polyethylene cross-linkable by peroxide as insulation material in most medium- and high-voltage cables, and the manufacturing process generally employs a so-called dry-vulcanization method, wherefore the method according to the invention will be described below with reference to the above-mentioned material and the vulcanization principle. Dry-vulcanization means that the cross-linking of the insulation plastic takes place in completely dry conditions in a pressurized shielding gas. The dry shielding gas may be e.g. nitrogen. Even though the following description relies on the above-mentioned matters, it is, however, to be noted that other principles and materials are not excluded from the scope of protection.

Figure 1:
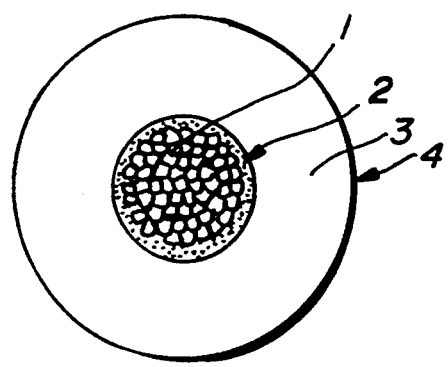
FIG. 1 shows a typical cross-section of an insulated conductor of a high-voltage cable.

In dry vulcanization, the insulated conductor shown in FIG. 1 typically emerges from the triple extrusion head into a heated tube which is usually pressurized by nitrogen so as to heat the plastic layers, typically by heat radiation, to a temperature clearly above the extrusion temperature of the plastic in order to accelerate the cross-linking reaction. Run parameters such as the speed of the conductor and the temperature profile of the cross-linking section of the heated tube are calculated by a computer.

Figure 2:
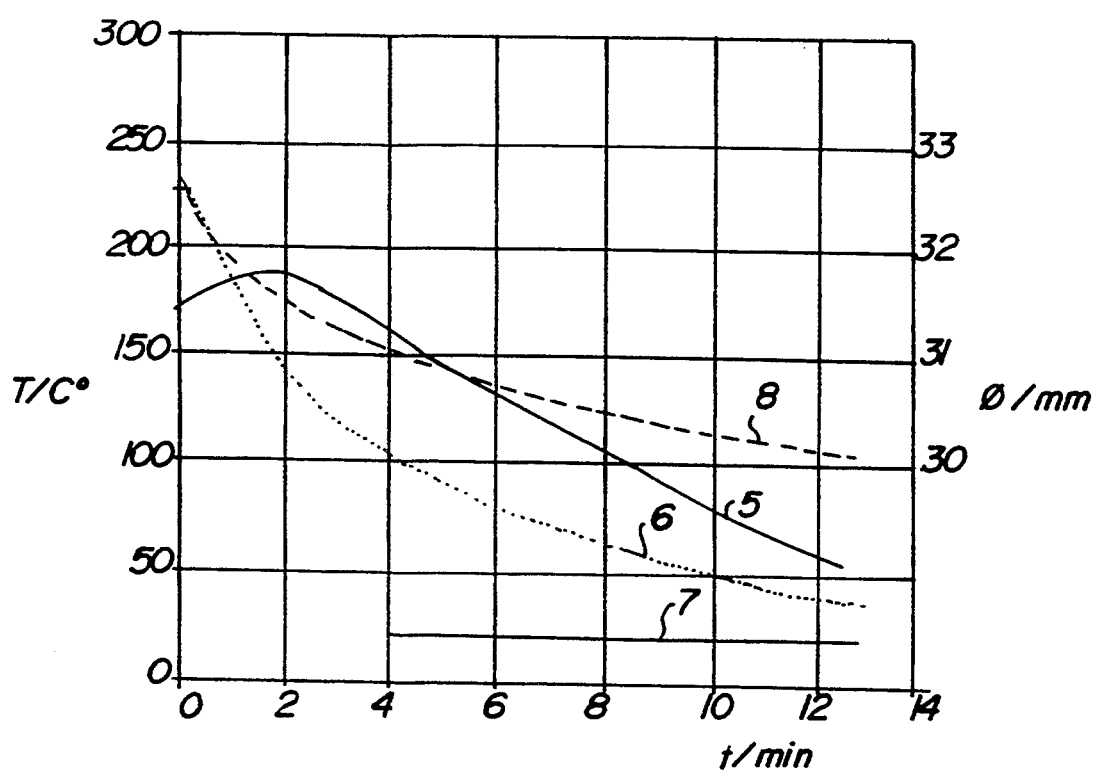
FIG. 2 is a graphical presentation illustrating variation in different parameters when the cable conductor enters the cooling step of the process.

FIG. 2 is a graphical presentation showing the temperature 5 of the conductor with the plastic layers on emerging from the cross-linking section to a pressurized water cooling step at 20° C., the temperature 6 of the centre point of the insulation, and the temperature 7 and the outer dimension 8 of the surface layer as a function of time. The diameter of the insulated conductor is 30 mm at 20° C., and the diameter of the conductor 1 itself is 10 mm. These values are obtained by a computer program which divides the plastic into 10 cylinder-symmetrical layers and calculates the transfer of heat between the layers and the heat expansion of the layers.

In the specific case described above, the specific volume of the plastic decreases about 13% when the temperature drops from the melting point, about 110° C., to 20° C. As it may be assumed that the metal conductor is fully rigid as compared with the plastic, the entire volume change has to take place in the cross-section, that is, in the radial direction.

FIG. 2 thus illustrates a way of cooling used in connection with the conductor insulation process, in which the insulated conductor is cooled in a predetermined manner.

In the invention, the cooling is not carried out in the above-described way, but it is essential that after the conductor 1 and the plastic material in vicinity to it have cooled to a predetermined level in the insulation process, the surface layer of the plastic material and the plastic material portions in vicinity to it are reheated to a predetermined temperature. In a preferred embodiment, the surface layer of the plastic material and the material portions in vicinity to it are reheated to a temperature slightly below the melting point of the plastic material after the conductor 1 and the plastic material in vicinity to it have cooled substantially to the melting point of the plastic material.

Figure 3:
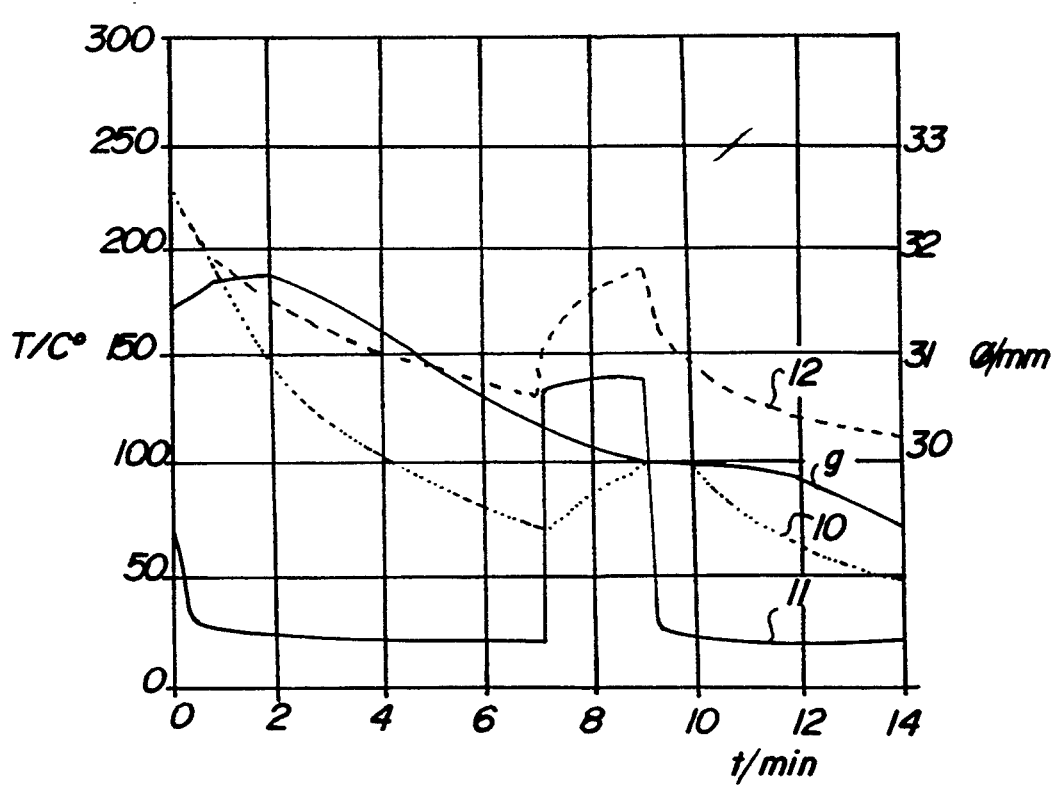
FIG. 3 illustrates variation in the parameters of FIG. 2 when applying the method according to the invention.

FIG. 3 shows curves corresponding to the curves shown in FIG. 2 and obtained when using the method according to the invention. FIG. 3 shows the temperature 9 of the conductor, the temperature 10 of the centre point of the insulation, and the temperature 11 and the outer dimension 12 of the surface layer as a function of time.

As appears from FIG. 3, the heating of the conductor with 140° C. water has been started when the temperature of the conductor has dropped to 117° C. Heating has been continued until the temperature of the centre point of the insulation has risen to 100° C., whereafter the cooling of the conductor with 20° C. water has been restarted. The curves shown in FIGS. 2 and 3 are identical for about 7 minutes, as the conditions are identical. It can be seen from the curves shown in FIG. 3 that the temperature 11 of the outermost layer rises rapidly after 7 minutes to about 140° C., the temperature 10 of the centre point starts to rise, the decrease in the temperature 9 of the conductor becomes slower, and the diameter 12 increases. At about 9.1 minutes, it can be seen that the temperature of the plastic from the conductor to the centre point is about 100° C., and from the centre point to the outer layer >100° C. If the temperature of 100° C. is assumed to be a kind of mechanical hardening temperature for this kind of plastic, i.e. that the plastic behaves below this temperature similarly as solid substances, such as metal, with respect to thermal expansion and mechanical stresses, it appears from the diameter curve 12 of FIG. 3 that the outer layer is hardened to a diameter of 31.7 mm. From FIG. 2, in turn, it appears that the temperature 7 of the outer layer ultimately falls below 100° C. when the outer diameter 8 is 33.0 mm.

The computer program divides the plastic insulation of the conductor at 20° C. into ten layers of uniform thickness. The program also stores the inner and outer diameter of each layer when the temperature of the layer ultimately falls below 100° C. The dimensions of all layers would, of course, change in the same proportion when the temperature of the layers decreases from 100° C. to 20° C., if the layers were apart from each other. As this is not the case and as, for instance, the diameter of the outermost layer is 30 mm irrespective of whether the conductor is cooled in accordance with FIG. 2 or 3, the outer layer has to contract from 33.0 mm to 30 mm when applying cooling in accordance with FIG. 2 and from 31.7 to 30 mm when cooling in accordance with FIG. 3 as the temperature drops from 100° C. to 20° C.

Figure 4:
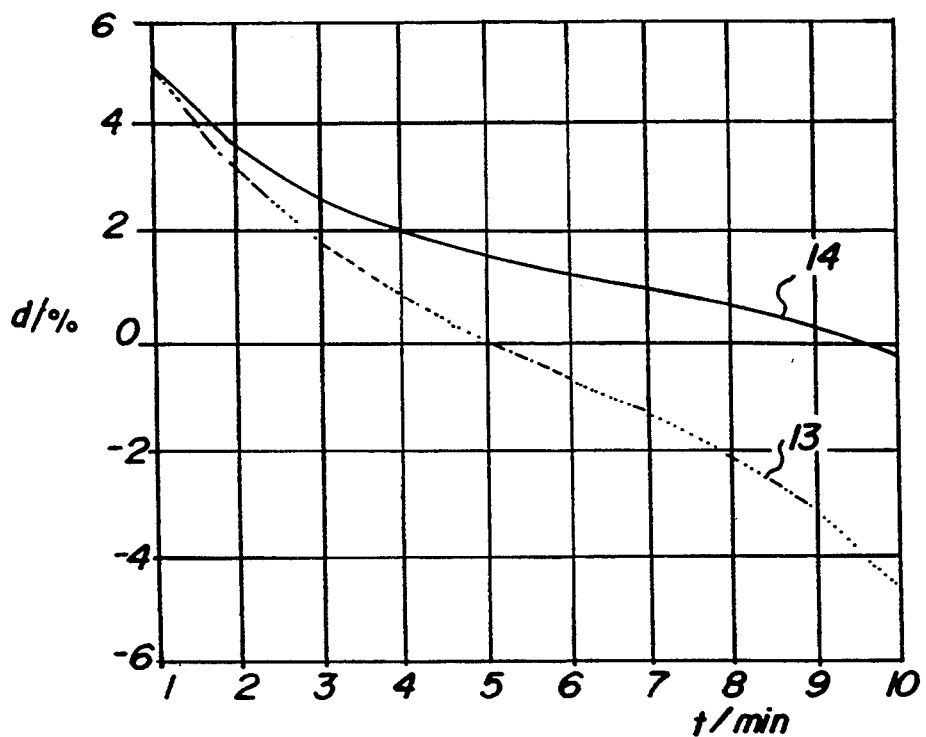
FIG. 4 illustrates the diameters of the plastic material layers calculated from FIGS. 2 and 3 as compared with the actual diameters when the temperature drops to 20° C.

If the diameters of layers taken apart from each other are compared with the actual diameters when the temperature drops to 20° C., the percentage curves shown in FIG. 4 are obtained. The curve 13 is obtained by cooling in accordance with FIG. 2, and the curve 14 correspondingly by cooling according to the invention, illustrated in FIG. 3. The curve 13 shows that when taken apart the outermost layer would remain about 4.6% oversize, so that there is actually tangential compression stress present in it, which extends up to the layer 5, and is then changed into tensile stress. The outer layer of the conductor cooled by means of the method according to the invention remains only about 0.1% oversize, and the tangential force consists of tension almost throughout the thickness of the plastic layer. It is obvious that the innermost layer behaves similarly in both cases, as the conductor 1, which is assumed to be unchanged, lies below it. As the tangential tensile stress present in the layers increases the surface pressure exerted on the conductor, the cooling in accordance with FIG. 3 provides a greater friction force between the plastic and the conductor than the cooling according to FIG. 2. Consequently, the cooling according to the invention decreases the longitudinal shrinkage.

The method according to the invention has a wide range of different applications. One example of such applications is the apparatus implementation described in Finnish Patent Specification 52299 and the corresponding U.S. Pat. No. 4,035,129, in which a tube defines a space through which the conductor passes. The tube also serves as a heating resistor in the apparatus. The heat treatment of the cable may be realized by dividing even the cooling section of the tube into separate zones with separate gas or water circulations. If the cooling medium is water, that is, water cooling and, in the heat treatment section, water heating are used, the tube heats the water and the water heats the conductor. When gas is used, the heating of the conductor takes place mainly by heat radiation. In both cases, it is, of course, necessary to prevent the mixing of the cooling medium between the heat treatment section and the cooling zones on its both sides.

The above-described embodiment is by no means intended to restrict the invention, but the invention may be modified within the scope of the claims as desired. Accordingly, it is obvious that the invention is not in any way restricted to a cross-linking reaction, but it may be applied in other connections as well. For example, stress states may occur in the relatively thick sheathing layer in certain cable types due to excessively rapid cooling, which stresses can be removed in an advantageous manner by heat treatment. The invention is no% either restricted to medium- and high-voltage cables, but it can be applied more widely, e.g. in the sheathing of optical cables.

I claim:
1. In a method for insulating or sheathing conductors, wherein cross-linkable plastic material is extruded onto an outer surface of a conductor, and thereafter cooled in a predetermined manner, an improvement comprising:
   a) cooling the conductor and proximate cross-linkable plastic material substantially to the melting point of the cross-linkable plastic material; and then
   b) reheating the surface of the cross-linkable plastic material and proximate cross-linkable plastic material substantially to the melting point of the cross-linkable plastic material in a pressurized space filled with gas.

* * * * *

UNITED STATES PATENT AND TRADEMARK OFFICE
CERTIFICATE OF CORRECTION

PATENT NO. : 5,449,488
DATED : September 12, 1995
INVENTOR(S) : KARPPO

It is certified that error appears in the above-indentified patent and that said Letters Patent is hereby corrected as shown below:

On the title page, item 22, delete "Oct. 29, 1992" and insert therefor --Oct. 28, 1992--.

Signed and Sealed this

Ninth Day of January, 1996

*Attest:*

BRUCE LEHMAN

*Attesting Officer*   *Commissioner of Patents and Trademarks*